United States Patent
Hashiguchi

(10) Patent No.: US 6,851,302 B2
(45) Date of Patent: Feb. 8, 2005

(54) DEVICE AND METHOD FOR DETECTING A MISFIRE STATE OF AN ENGINE

(75) Inventor: Yukihide Hashiguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/215,029

(22) Filed: Aug. 9, 2002

(65) Prior Publication Data

US 2003/0051538 A1 Mar. 20, 2003

(30) Foreign Application Priority Data

Aug. 23, 2001 (JP) .................................... 2001-252828

(51) Int. Cl.$^7$ ............................ G01L 3/26; G01L 5/13; G01M 15/00
(52) U.S. Cl. .................................................. 73/117.3
(58) Field of Search ............................. 73/117.3, 116, 73/118.1; 701/110, 111; 123/436, 406.59, 179.21, 406.27, 406.18, 679, 479, 362, 286; 60/274, 277; 702/41

(56) References Cited

U.S. PATENT DOCUMENTS

| | | | |
|---|---|---|---|
| 4,932,379 A | | 6/1990 | Tang et al. |
| 5,309,756 A | * | 5/1994 | Osawa et al. .................. 73/116 |
| 5,529,041 A | * | 6/1996 | Andrews ...................... 123/436 |
| 5,611,754 A | * | 3/1997 | Haga et al. .................. 477/181 |
| 5,808,186 A | * | 9/1998 | Matsumoto et al. ........ 73/117.3 |

FOREIGN PATENT DOCUMENTS

| | | |
|---|---|---|
| DE | 198 52 058 A1 | 6/2000 |
| EP | 0 708 234 A2 | 4/1996 |
| JP | A 4-298682 | 10/1992 |

OTHER PUBLICATIONS

Air Resources Board, May 26, 1999.

* cited by examiner

Primary Examiner—Edward Lefkowitz
Assistant Examiner—Octavia Davis
(74) Attorney, Agent, or Firm—Oliff & Berridge, PLC

(57) ABSTRACT

A misfire detecting device and method detects a misfiring state of an engine. A memory stores misfire-frequency data relating to a frequency of occurrence of a misfire of the engine, and a controller determines, on the basis of the misfire-frequency data, whether the misfiring state of the engine has occurred. The controller initiates a misfire detecting operation of detecting an occurrence of the misfire of the engine when a predetermined first condition is satisfied, and initializes the misfire-frequency data stored in the memory when a predetermined second condition is satisfied. The first condition indicates that the engine has entered into its firing state by cranking of the engine for starting thereof, while the second condition indicates that the engine has failed to enter into its firing state by the cranking. The misfire detecting device permits accurate detection of the misfiring state of the engine, irrespective of repeated cranking operations of the engine due to its repeated firing failures.

19 Claims, 4 Drawing Sheets

DEVICE AND METHOD FOR DETECTING A MISFIRE STATE OF AN ENGINE

INCORPORATION BY REFERENCE

The disclosure of Japanese Patent Application No. 2001-252828 filed on Aug. 23, 2001, including the specification, drawings and abstract, is incorporated herein by reference in its entirety.

BACKGROUND OF THE INVENTION

1. Field of Invention

The present invention relates to a device for detecting a misfiring state of an engine, and a method of detecting the misfire.

2. Description of Related Art

An engine may suffer from a "misfire", which is an incomplete combustion of an air-fuel mixture in a combustion chamber that takes place under certain conditions such as an operating temperature of the engine and a state of a spark plug. When a misfire takes place in the combustion chamber, not only the operating speed of the engine drops, but also incomplete combustion gases are exhausted from the combustion chamber into the atmosphere. Frequent occurrence of the misfire disables the engine to produce its nominal torque. Further, it is desired to reduce the amount of the incomplete combustion gases exhausted from the combustion chamber, from the standpoint of preventing air pollution.

In view of the above, the operation of an engine is controlled by an electronic control unit (ECU), by controlling the ratio of an air-fuel mixture and the compression ratio within the combustion chamber, so as to prevent a misfire in the combustion chamber. In addition, the ECU monitors the operating state of the engine, to detect an occurrence of the misfire, and activates a suitable alarm indicator when the frequency of occurrence of the misfire has exceeded a threshold, so that the user of the engine is informed of an abnormal combustion state of the engine and is prompted to take an immediate inspection or repair of the engine as needed.

In a multi-cylinder engine, for example, the above-indicated monitoring of the misfire is implemented as described below. Namely, an occurrence of a misfire in a given cylinder causes a drop of the operating speed of the engine in the combustion cycle involving the misfiring cylinder. As a result, a time required for the engine output shaft or crankshaft to rotate a predetermined angle (° CA) is increased in the combustion cycle involving the misfiring cylinder. This increased time is compared with a time required for the crankshaft to rotate the predetermined angle in the last combustion cycle involving another cylinder. If a difference between these two times is larger than a threshold value, it is determined that a misfire has occurred in the present combustion cycle. If the frequency of occurrence of the misfire has exceeded the threshold, it is detected that the engine is suffering from the misfire.

However, a variation of the operating speed of the engine does not take place solely due to a misfire in the combustion chambers of the engine. Where the engine is installed on an automotive vehicle, for instance, the operating speed of the engine may vary upon application of an abrupt brake to the vehicle or during running of the vehicle on a rough road. It may occur that a detection of a misfire of the combustion engine is not normally performed, due to the variation of the operating of the operating speed of the engine, caused by the above-described abrupt brake or running on a rough road. The electronic control device may be arranged such that once the alarm indicator such as an alarm lamp has been activated as a result of detection of the misfiring state of the engine. The alarm indicator cannot be turned off, unless the engine has been inspected or repaired by the manufacturer of the engine or a service shop.

Various misfire detecting devices have been proposed to avoid an erroneous detection of a misfire in the engine. JP-A-6-307284 discloses an example of such misfire detecting devices. The misfire detecting device in this example is adapted to measure a time required for the crankshaft to rotate a predetermined angle in the combustion cycle of each cylinder of the engine, and determine that there is a possibility of the misfire in the present combustion cycle if a difference of the time measured in the present combustion cycle with respect to that in the last combustion cycle is larger than a predetermined threshold. This misfire detecting device is further adapted to obtain a pattern of variation of the time in each of the successive combustion cycles during the past period back to the crank angle position of 720° CA. On the basis of the thus obtained pattern of variation of the time, the conventional misfire detecting device determines whether a misfire has occurred in the present combustion cycle. This arrangement permits accurate monitoring of the misfiring state of a multi-cylinder engine installed on an automotive vehicle, for example, without a risk of erroneous detection of the misfiring engine even when an abrupt brake is applied to the running vehicle.

To monitor the operation of the engine for detecting a misfiring state of the engine immediately after the starting of the engine, it is required to accurately detect a moment of transition of the operating state of the engine to its self-sustaining state (firing state). However, it is difficult to accurately detect the moment of transition of the engine to its firing state. Therefore, the electronic control device (ECU) is arranged to determine that the engine has entered into the firing state when the operating speed of the engine has reached a predetermined value. In this arrangement, a misfire monitoring routine is initiated by the ECU upon determination that the engine has entered into the firing state, so that the subsequent operation of the engine is monitored for occurrence of a misfire.

On the other hand, the moment at which the engine has actually entered into the firing state may differ from the moment of determination by the ECU that the engine has entered into the firing state after starting of the engine. This difference may cause the following problems. That is, after the ECU has initiated the misfire monitoring routine as a result of its determination that the engine has entered into the firing state after the starting of the engine, the engine may actually be turned off without establishment of its firing state. In this case, misfire-frequency data indicative of the frequency of occurrence of a misfire of the engine during a period between the above-indicated two moments are stored in a memory incorporated in the ECU, and are kept in the memory as long as the ECU is held on, that is, until electric power is removed from the ECU. If the engine starting that does not result in the firing state of the engine is repeated, the frequency of occurrence of the misfire as represented by the stored misfire-frequency data is increased, leading to a risk that the ECU erroneously determines that the engine is in the misfiring state, while in fact the engine has not entered into the firing state.

SUMMARY OF THE INVENTION

The present invention was made in the light of the above-described background art. It is therefore a first object of the present invention to provide a device capable of accurately detecting a misfire of an engine, even where starting of the engine which does not result in the firing state of the engine is repeated.

It is a second object of this invention to provide a method which permits accurate detection of a misfire of the engine, even where such starting of the engine is repeated.

The first object indicated above may be achieved according to one aspect of this invention, which provides a misfire detecting device for detecting a misfiring state of an engine, comprising: a memory that stores misfire-frequency data relating to a frequency of occurrence of a misfire of the engine. A controller is provided that is operable to determine, on the basis of the misfire-frequency data, whether the misfiring state of the engine has occurred. The controller initiates a misfire detecting operation of detecting an occurrence of the misfire of the engine when a predetermined first condition is satisfied. The controller initializes the misfire-frequency data stored in the memory when a predetermined second condition is satisfied. The predetermined first condition indicates that the engine has entered into its firing state by cranking of the engine for starting thereof, and the predetermined second condition indicates that the engine has failed to enter into its firing state by the cranking.

The second object indicated above may be achieved according to another aspect of this invention, which provides a method of detecting a misfiring state of an engine, comprising the steps of: initiating a misfire detecting operation of detecting an occurrence of a misfire of the engine when a predetermined first condition is satisfied, the predetermined first condition indicates that the engine has entered into its firing state by cranking of the engine for starting thereof; storing in a memory misfire-frequency data relating to a frequency of occurrence of the misfire of the engine, and determining, on the basis of the misfire-frequency data, whether the misfiring state of the engine has occurred; and initializing the misfire-frequency data stored in the memory when a predetermined second condition is satisfied, the predetermined second condition indicating that the engine has failed to enter into its firing state by the cranking.

In the misfire detecting device and method according to the present invention described above, the memory area of the memory which stores the misfire-frequency data relating to the frequency of occurrence of the misfire of the engine is cleared when the controller determines that the engine has failed to entered into its firing state by cranking of the engine for starting thereof. That is, the memory area is cleared before the engine is cranked again for starting of the engine after a firing failure of the engine by the last cranking operation. Thus, the present misfire detecting device and method are arranged to prevent a change of the misfire-frequency data stored in the memory, where cranking operations of the engine are repeated due to repeated firing failures of the engine. Accordingly, the present device and method permit accurate detection of a misfiring state of the engine, irrespective of such repeated firing failures. The predetermined first and second conditions may be the same condition. In this case, the controller determines that the engine has entered into its firing state, when the condition is satisfied, and determines that the engine has failed to enter into its firing state, when the condition is not satisfied.

The first object indicated above may also be achieved according to a further aspect of this invention, which provides a misfire detecting device for detecting a misfiring state of an engine, comprising: a memory for storing misfire-frequency data relating to a frequency of occurrence of a misfire of the engine; and a controller operable to determine, on the basis of the misfire-frequency data, whether the misfiring state of the engine has occurred. The controller initiates a misfire detecting operation of detecting an occurrence of the misfire of the engine when a predetermined condition is satisfied. The predetermined condition indicates that the engine has entered into its firing state by cranking of the engine for starting thereof. The controller initializes the misfire-frequency data stored in the memory each time the engine is cranked for starting of the engine.

The second object indicated above may also be achieved according to a still further aspect of the present invention, which provides a method of detecting a misfiring state of an engine, comprising the steps of: initiating a misfire detecting operation of detecting an occurrence of a misfire of the engine when a predetermined condition is satisfied, the predetermined condition indicating that the engine has entered into its firing state by cranking of the engine for starting thereof; storing in a memory misfire-frequency data relating to a frequency of occurrence of the misfire of the engine, and determining, on the basis of the misfire-frequency data, whether the misfiring state of the engine has occurred; and initializing the misfire-frequency data stored in the memory each time the engine is cranked for starting of the engine.

In the misfire detecting device and method according to the above-indicated further aspects of the present invention, the memory area of the memory which stores the misfire-frequency data relating to the frequency of occurrence of the misfire of the engine is cleared before a cranking operation of the engine for starting thereof is repeated after a firing failure of the engine by the last cranking operation. Thus, the misfire detecting device and method described above are arranged to prevent a change of the misfire-frequency data stored in the memory, where cranking operations of the engine are repeated due to repeated firing failures of the engine. Accordingly, the present device and method permit accurate detection of a misfiring state of the engine, irrespective of such repeated firing failures.

BRIEF DESCRIPTION OF THE DRAWINGS

The above summary and other objects, features, advantages, and technical and industrial significance of this invention will be better understood by reading the following detailed description of an exemplary embodiment of the invention, when considered in connection with the accompanying drawings, in which.

DETAILED DESCRIPTION OF EXEMPLARY EMBODIMENTS

Figure 1:
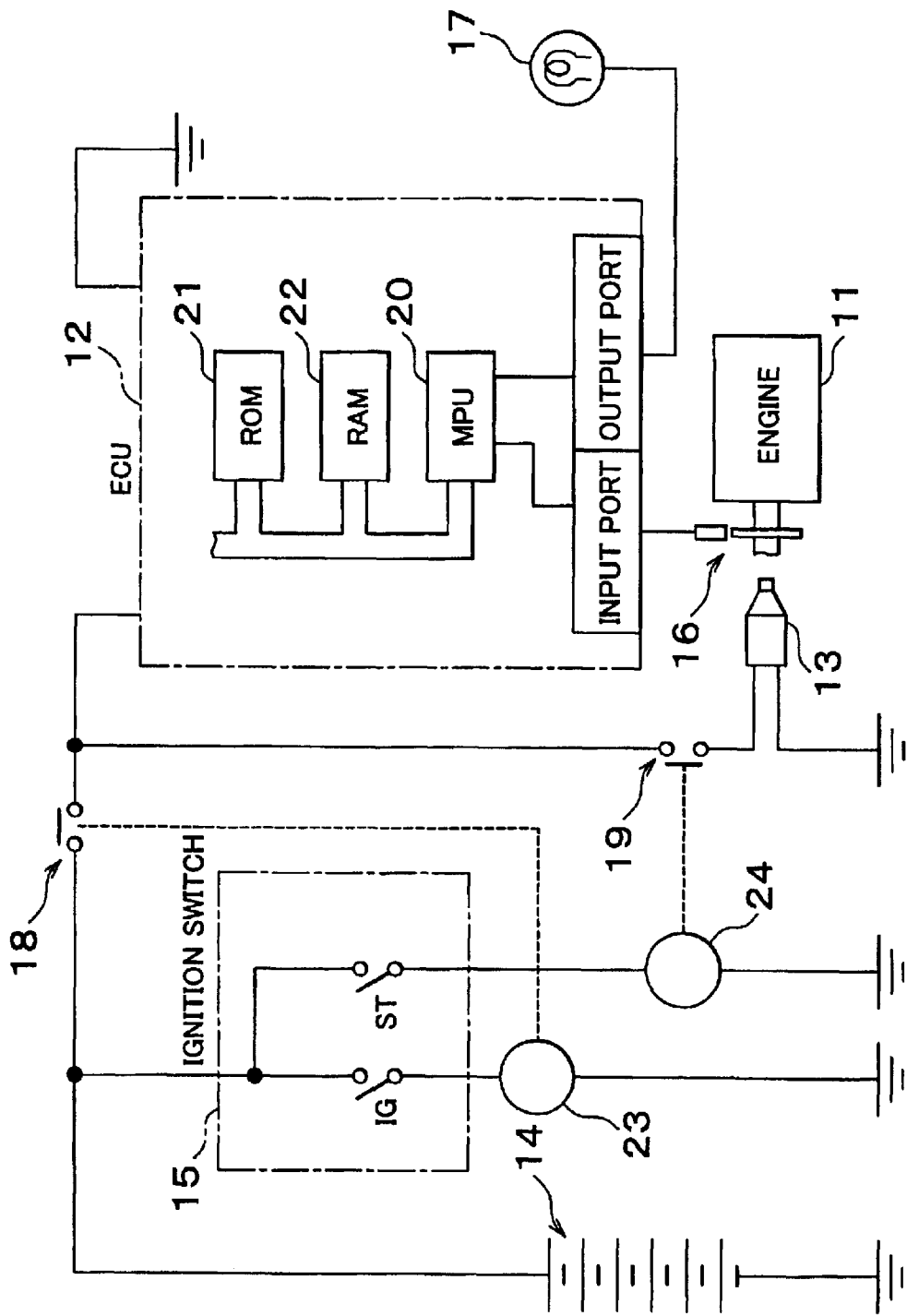
FIG. 1 is a schematic view illustrating a control apparatus for an internal combustion engine, in which control apparatus incorporates an exemplary misfire detecting device according to one exemplary embodiment of the present invention.

FIG. 1 illustrates a control apparatus for an engine 11 (hereinafter referred to as "engine 11") for an automotive vehicle. This control apparatus incorporates a misfire detecting device according to one exemplary embodiment of the present invention, and includes an electronic control unit (ECU) 12, a starter 13 for starting the engine 11, a battery 14 serving as an electric power source for the ECU 12 and the starter 13, and an ignition switch 15 for connecting the ECU 12 and the starter 13 to the battery 14. The engine 11 is provided with a crank angle sensor 16 for detecting an angular phase or position of its output shaft in the form of a crankshaft. The crank angle sensor 16 generates an output signal indicative of the angular position of the crankshaft, which is applied to an input port of the ECU 12. The output signal of the crank angle sensor 16 received by the input port is used not only for detecting not only the angular phase or angular position of the crankshaft, but also for calculating an operating speed NE and other parameters of the engine 11. The ECU 12 has an output port from which a drive signal is applied to an alarm lamp 17 to active the alarm lamp 17 upon detection of a misfiring state of the engine 11.

The ignition switch 15 includes two switches IG and ST. One end of each of the two switches IG, ST is connected to the battery 14. The other ends of the switches IG and ST are connected to a ground (reference potential of the vehicle) through drive coils 23, 24 of respective relays 18, 19, which are operable to connect the ECU 12 and the starter 13 to the battery 14, respectively.

The ECU 12 performs various control functions for controlling the engine 11 and the vehicle, and functions as part of the misfire detecting device according to the embodiment of this invention. The ECU 12 incorporates a microprocessor unit (MPU) 20 performing various arithmetic operations, a read-only memory (ROM) 21 storing control programs used to perform the arithmetic operations, and a random-access memory (RAM) 22 for temporarily storing various kinds of data such as variables, which are used to perform the arithmetic operations.

Figure 2:
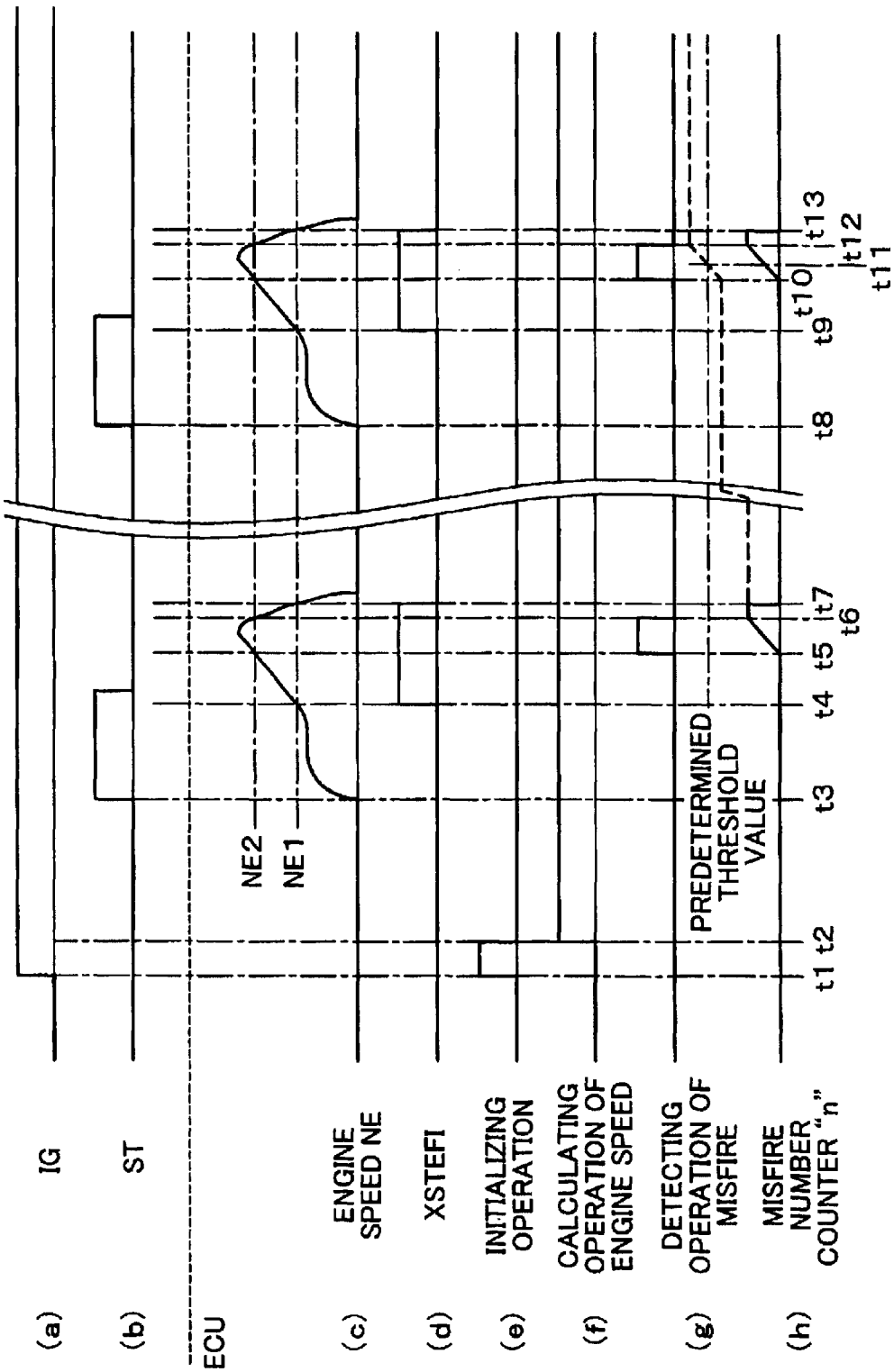
FIG. 2 is a time chart showing an example of events that take place when the operating state of the internal combustion engine is monitored by the misfire detecting device to detect a misfire of the engine according to the exemplary embodiment of the present invention.

The time chart illustrated in FIG. 2 describes an operation of the misfire detecting device to detect a misfiring state of the engine 11. The operation is initiated according to a signal received from an external device.

When the ignition switch 15 is operated to turn on or close the switch IG at a point of time t1, the relay 18 (FIG. 1) is closed with its drive coil 23 being energized, and a voltage of the battery 14 is applied to the ECU 12 so that the ECU 12 is turned on. The voltage of the battery 14 applied to the ECU 12 is applied to the MPU 20, RAM 22 and other circuits through a voltage stabilizer circuit (not shown). When the ECU 12 is turned on as described above, the MPU 20 operates to initialize the RAM 22, and perform other initializing operations, as indicated at (a) and (e) in FIG. 2. Then, the MPU 20 initiates various arithmetic operations, such as, calculation of an operating speed NE of the engine 11, at point of time t2, as indicated at (f) in FIG. 2. At the point of time t2 at which the initialization of the ECU 12 is terminated, the operating speed NE is calculated to be zero (0). That is, a predetermined condition for detecting a misfire of the engine 11 is not satisfied, so that the detection of the misfire is not performed, as indicated at (g) in FIG. 2.

When the ignition switch 15 is then operated to turn on or close the switch ST at point of time t3, as indicated at (b) in FIG. 2, the relay 19 is closed with its drive coil 24 being energized, and a voltage is applied to the starter 13 (FIG. 1).

As a result, the starter 13 is operated to crank the engine 11, and the engine speed NE as calculated by the ECU 12 rises, as indicated at (c) in FIG. 2. As the engine 11 is cranked by the starter 13, combustion takes place in the combustion chambers of the engine 11, so that the engine speed NE further rises above an upper limit that can be reached by cranking by the starter 13. When the engine speed NE has reached or exceeded a first threshold value NE1, at point of time t4, the ECU 12 turns on a POST-CRANKING flag XSTEFL as indicated at (c) and (d) in FIG. 2. The flag XSTEFI in the on state means a transition of the engine 11 is performed from its cranking state toward its firing state. With subsequent combustion in the combustion chambers of the engine 11, the engine speed NE further rises. When the engine speed NE has reached or exceeded a second threshold value NE2, at point of time t5, the misfire detecting condition for detecting a misfire in each combustion cycle is satisfied, and the misfire detection is initiated, as indicated at (g) in FIG. 2. The ECU stores data indicative of the number "cnt" of misfire detecting cycles which have been implemented, and data indicative of the number of detected occurrences of the misfire as counted by a MISFIRE NUMBER counter "n", as indicated at (h) in FIG. 2. While the misfire detecting condition is satisfied when the engine speed NE has reached or exceeded the second threshold value NE2 in the present embodiment, a determination as to whether the misfire detecting condition is satisfied or not may be performed on the basis of not only the engine speed NE but also any other appropriate parameters, such as for example, the temperature of the intake air introduced from the atmosphere into the combustion chamber, and the temperature of the engine cooling water.

The number "cnt" of misfire detecting cycles is incremented each time the misfire detecting cycle is implemented, and the MISFIRE NUMBER counter "n" is incremented each time the misfire is detected. Thus, misfire-frequency data indicative of the number "cnt" and the content of the counter "n" stored in the RAM 22 are updated.

Figure 3:
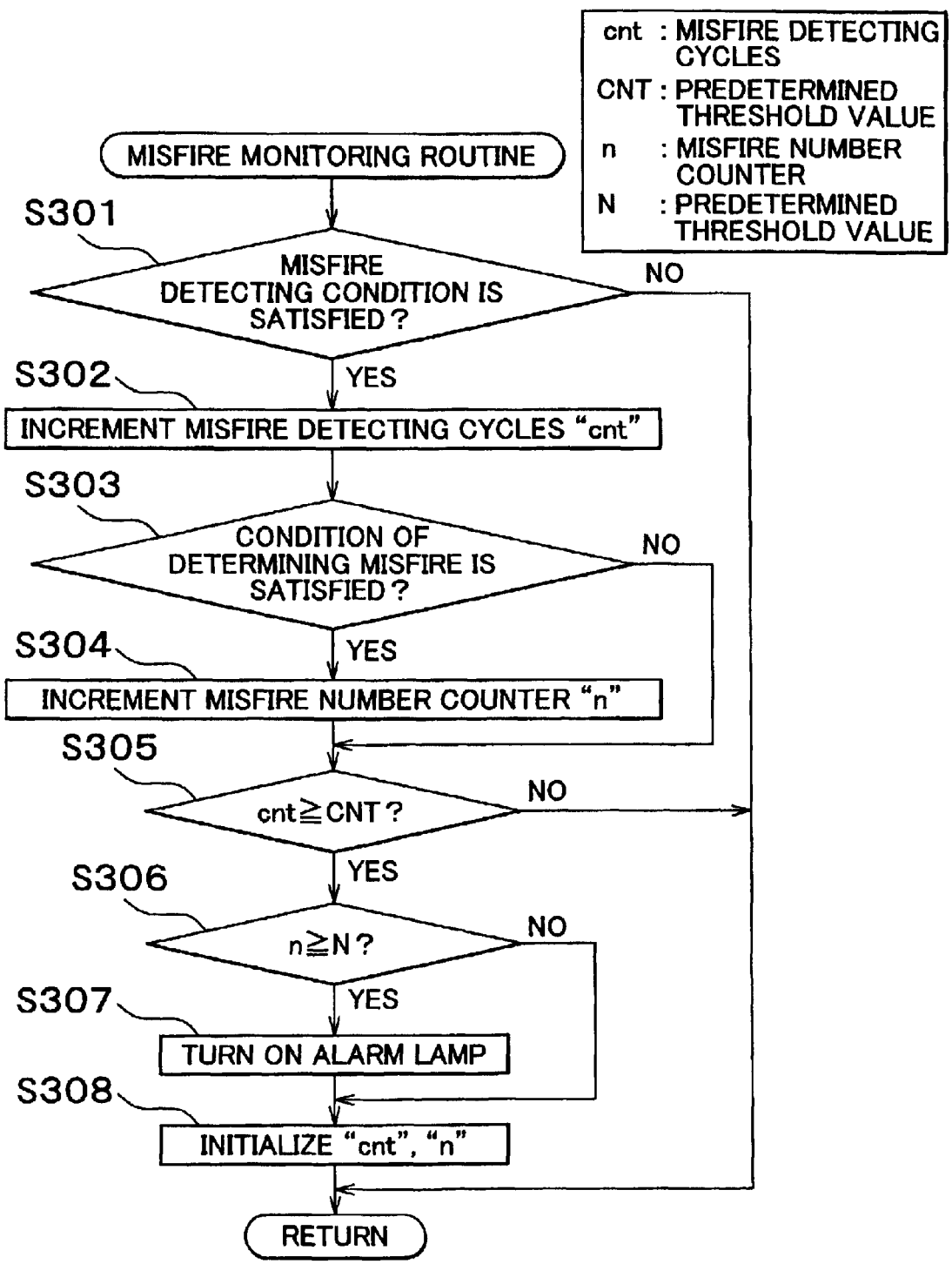
FIG. 3 is a flow chart illustrating an example of a misfire monitoring routine executed by the misfire detecting device according to the exemplary embodiment of the present invention.

If the cranking of the engine 11 by the starter 13 does not cause the engine to enter into its firing state, the engine speed NE rapidly drops as indicated at (c) in FIG. 3. During the period of this drop of the engine speed NE and until the engine speed NE has dropped below the second threshold value NE2 at point of time t6, the ECU 12 continues to update the misfire-frequency data indicative of the number "cnt" of the misfire detecting cycles and the content of the MISFIRE NUMBER counter "n". At the point of time t6 at which the misfire detecting condition has been removed, the misfire detection is terminated, as indicated at (g) and (h). At point of time t7 at which the engine speed NE has dropped below the first threshold value NE1, the ECU 12 resets or turns off the POST-CRANKING flag XSTEFI, as indicated at (d) in FIG. 2.

Referring next to the flow chart of FIG. 3, a misfire monitoring routine to monitor the operating condition of the engine 11 for detecting a misfiring state of the engine 11 is described.

As shown in FIG. 3, the misfire monitoring routine is initiated with step S301 to determine whether the misfire detecting condition is satisfied or not. While the misfire detecting condition is not satisfied, the ECU 12 skips the following steps (S302–S308) for detecting a misfire of the engine 11. When the misfire detecting condition is satisfied with the engine speed NE reaching or exceeding the first threshold value NE1, the control flow goes to step S302 to increment the number "cnt" of the misfire detecting cycles. Step S302 is followed by step S303 to determine whether a misfire of the engine 11 has taken place. If it is determined that the misfire of the engine 11 has taken place, the control flow goes to step S304 to increment the MISFIRE NUMBER counter "n". If it is determined that the misfire has not taken place, the ECU 12 skips step S304. The determination in step S303 as to whether the misfire of the engine 11 has taken place is performed on the basis of an amount of variation of the crank angle as calculated by the ECU 12 on the basis of the output signal of the crank angle sensor 16. The determination in step S303 is arranged such that even if the amount of variation of the crank angle indicates a misfire of the engine 11, an affirmative decision (YES) is not obtained in step S303 (and the MISFIRE NUMBER counter "n" is not incremented in step S304) unless it is confirmed that the variation of the crank angle is derived from an actual misfire of the engine 11 in the combustion cycle in question. To this end, a pattern of change in the amount of variation of the crank angle is monitored to confirm that the variation of the crank angle is derived from an actual misfire of the engine 11, rather than an abrupt brake application to the running vehicle or a running of the vehicle on a rough road surface. Thus, even if the amount of variation of the crank angle is larger than a threshold value, the counter "n" is not incremented unless it is confirmed that the amount of variation of the crank angle has been caused due to an actual misfire of the engine 11. Accordingly, the content of the MISFIRE NUMBER counter "n" accurately represents the number of occurrences of the engine misfire, namely, the frequency of the engine misfire.

Then, the ECU 12 compares the number "cnt" of misfire detecting cycles and the content of the MISFIRE NUMBER counter "n" with respective threshold values. Before the number "cnt" of misfire detecting cycles has reached a predetermined threshold value CNT (that is, unless an affirmative decision (YES) is obtained in step S305), the ECU 12 skips the following steps (S306 to S308) of the routine. When the number "cnt" has reached or exceeded the threshold value CNT, the control flow then goes to step S306 to determine whether the content of the MISFIRE NUMBER counter "n" (namely, the number of occurrences of engine misfire) has reached or exceeded a predetermined threshold value "N". If an affirmative decision (YES) is obtained in step S306, the control flow goes to step S307 to turn on the alarm lamp 17. Thus, the ECU 12 implements steps S306 and S307 each time the number "cnt" of misfire detecting cycles has reached the predetermined threshold value CNT. Step S307 is followed by step S308 to zero or initialize the number "cnt" and reset or initialize the MISFIRE NUMBER counter "n". The threshold value CNT for the number "cnt" may correspond to, for example, the number of misfire detecting cycles to be implemented during 1000 revolutions of the engine 11.

If the engine 11 cranked by the starter 13 does not enter into its firing state and is turned off after the misfire detection has been initiated at the point of time t5, as described above by reference to FIG. 2, the RAM 22 of the ECU 12 maintains, in appropriate memory areas, data indicative of the number "cnt" of the misfire detecting cycles and misfire number data indicative of the content of the MISFIRE NUMBER counter "n". The content of this counter "n" in this event tends to be larger than while the engine 11 is stably placed in a normally firing state after starting. This tendency is due to interruption or failure of combustion in the combustion chambers before the engine 11 has entered into its firing state. Accordingly, when the starting of the engine 11 has not resulted in the firing state of the engine 11, there is a higher probability of determination in step S303 in the routine of FIG. 3 that a misfire of the engine 11 has taken place.

Figure 4:
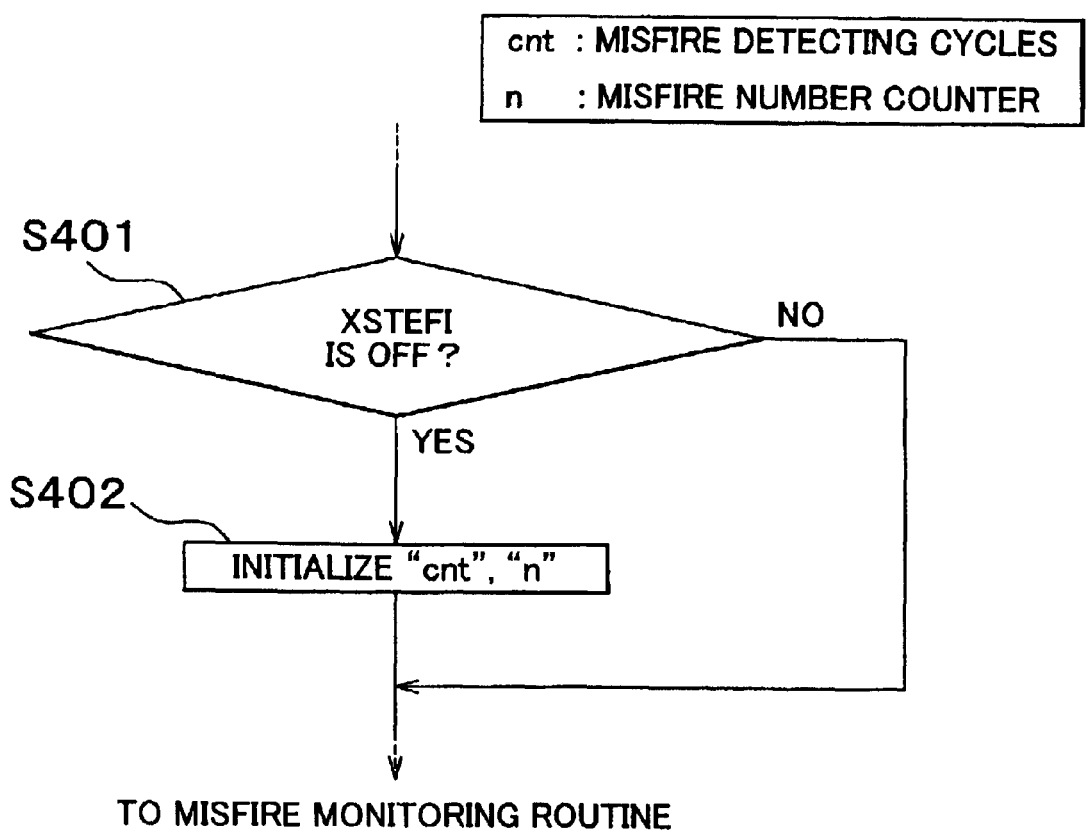
FIG. 4 is a flow chart illustrating an example of initialization of the number of misfire detecting cycles and a MISFIRE NUMBER counter which are used in the misfire monitoring routine of FIG. 3.

In view of the above tendency, the misfire detecting device according to the present exemplary embodiment is arranged such that the ECU 12 monitors the operating state of the engine 11 after the switch IG of the ignition switch 15 is turned on at point of time t1, so that the number "cnt" of misfire detecting cycles and the content of the MISFIRE NUMBER counter "n" are reset or initialized to zero, if the engine 11 cranked by the starter 13 is turned off without firing. That is, the above-indicated memory areas of the RAM 22 are cleared or initialized if the engine 11 has failed to enter into its firing state by cranking by the starter 13 for starting the engine 11. The ECU 12 initiates a routine illustrated in the flow chart of FIG. 4 when the misfire detection is initiated with the engine speed NE rising to the second threshold value NE2. The routine of FIG. 4 is initiated in step S401 to determine whether the POST-CRANKING flag XSTEFI is placed in the off state. This flag XSTEFI is reset or turned off when the engine speed NE has dropped below the first threshold value NE1 at point of time t7, as indicated at (c) and (d) in FIG. 2, as described above. If the flag XSTEFI is in the off state, the control goes to step S402 to reset or initialize both of the number "cnt" and the content of the MISFIRE NUMBER counter "n" to zero, as indicated by solid line at (h) in FIG. 2.

Thus, the number "cnt" and the content of the MISFIRE NUMBER counter "n" are reset or initialized to zero if the engine 11 cranked by the starter 13 does not enter into the firing state and is turned off after the misfire detection is initiated at the point of time t5 after cranking of the engine 11 by the starter 13. Accordingly, repeated failures of the engine 11 to enter into the firing state increment neither the number "cnt" nor the MISFIRE NUMBER counter "n".

When the switch IG of the ignition switch 15 is turned off after the starting or cranking of the engine 11, the ECU 12 is disconnected from the battery 14, and all of the control data stored in the RAM 22 is erased since the RAM 22 is a volatile memory.

In the conventional engine misfire detecting device wherein the misfire-frequency data is not initialized, the number "n" of the misfire detecting cycles and the content of the MISFIRE NUMBER counter "n" are not reset or initialized to zero even where the engine 11 is turned off without firing by cranking by the starter 13. That is, the number of occurrences of the misfire of the engine 11 detected during a starting of the engine 11 that has not entered into its firing state are counted by the MISFIRE NUMBER counter "n", and the misfire number data indicative of this number are maintained. According to this conventional arrangement, the electronic control unit activates an alarm indicator (in a step equivalent to the step S307 of FIG. 3) when the content of the MISFIRE NUMBER counter "n" after the number "cnt" of the misfire detecting cycles has increased to the threshold value "N" as a result of repeated firing failures of the engine 11, at point of time t11, as indicated by broken line at (h) in FIG. 2.

When the switch IG of the ignition switch 15 is turned off after the starting or cranking of the engine 11, the ECU 12 is disconnected from the battery 14, and all of the control data stored in the RAM 22 is erased since the RAM 22 is a volatile memory.

The engine misfire detecting device according to the above-described present exemplary embodiment has the following advantages:

(1) The misfire-frequency data, that is, data indicative of the number "cnt" of the misfire detecting cycles and misfire number data indicative of the content of the MISFIRE NUMBER counter "n", which are stored in the RAM 22, is reset or initialized if the engine 11 is turned off after initiation of the misfire detection, without firing of the engine as a result of cranking or starting by the starter 13. This arrangement permits accurate detection of a misfiring state of the engine 11, even where the engine 11 repeatedly fails to enter into its firing state while the ECU 12 is held in the on state with continued power supplied thereto. Accordingly, the present engine misfire detecting device prevents erroneous detection of a misfiring state of the engine 11 which would be imposed on the user of the vehicle equipped with the engine 11.

(2) The determination as to whether a misfire of the engine 11 has taken place is performed on the basis of a pattern of change in the amount of variation of the rotating angle of the crankshaft or output shaft of the engine 11, which is calculated by the ECU 12 on the basis of the output signal of the crank angle sensor 16. This arrangement assures accurate determination as to whether a misfire in the combustion chambers of the engine 11 has taken place. Further, the determination on the basis of the pattern of change in the amount of variation of the rotating angle of the crankshaft makes it possible to prevent an erroneous determination of a misfire due to an excessively large calculated amount of variation of the rotating angle which is not caused by an actual misfire in the combustion cycle of the engine 11. Thus, it is possible to prevent the MISFIRE NUMBER counter "n" from being incremented due to the erroneous determination. This arrangement further improves the detecting accuracy of the present engine misfire detecting device.

(3) The determination as to whether the engine 11 has entered into its firing state is performed by determining whether the engine speed NE has reached or exceeded a predetermined threshold value. This arrangement permits easy detection of the firing state of the engine 11.

(4) The misfire detecting device is used for the engine 11 of an automotive vehicle. Therefore, an ECU 12 already provided as a control device for the vehicle, and appropriate sensors and switches already provided on the vehicle may be utilized for the misfire detecting device, so that the misfire detecting device is available at a relatively low cost. Further, the use of such sensors and switches permits accurate detection of the engine misfire on the basis of information reflecting various operating and running states of the vehicle, such as, acceleration and deceleration values and the roadway surface condition.

The illustrated exemplary embodiment described above may be modified as described below.

In the illustrated exemplary embodiment, the number "cnt" of the misfire detecting cycles and the content of the MISFIRE NUMBER counter "n" are reset or initialized when the engine 11 cranked by the starter 13 is turned off without firing. That is, when the ECU 12 determines that the POST-CRANKING flag XSTEFI is reset to the off state. The flag XTEFI is set to the on state upon transition of the engine 11 from the cranking state toward the firing state. However, the firing failure of the engine 11 may be detected on the basis of the engine speed NE, or both, the engine speed NE and the state of the POST-CRANKING flag XSTEFI, rather than on the basis of only the state of the flag XSTEFI. Further, the routine of FIG. 4 to initialize or reset the number "cnt" and the counter "n" need not be continuously performed during time periods between the adjacent cranking operations of the engine 11 by the starter 13 which are performed due to repeated firing failures of the engine 11. However, the routine of FIG. 4 may be executed only once for each cranking operation of the engine 11, so that the stored misfire-frequency data stored in the last cranking operation, which has resulted in the firing failure of the engine 11, can be initialized before initiation of the next cranking operation. Alternatively, the ECU 12 may be arranged to initialize the misfire-frequency data each time the engine 11 is cranked by the starter 13 for starting of the engine 11, that is, before each cranking operation of the engine 11.

While the ECU 12 uses the threshold value NE for detecting the transition of the engine 11 from the cranking state toward the firing state, and the threshold value NE2 for initiating the misfire detection, the threshold values NE1, NE2 may be suitably determined so as to meet the specific requirements.

Although the engine misfire detecting device of the illustrated exemplary embodiment is adapted to be used for an engine 11 installed on an automotive vehicle, the engine misfire detecting device according to the invention is equally applicable to, for example, any engine in general, as well as the engine for automotive vehicles.

In the illustrated embodiment, the controller (the ECU 12) is implemented as a programmed general purpose computer. It will be appreciated by those skilled in the art that the controller can be implemented using a single special purpose integrated circuit (e.g., ASIC) having a main or central processor section for overall, system level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the present invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A misfire detecting device for detecting a misfiring state of an engine, comprising:

a memory that stores misfire-frequency data relating to a frequency of occurrence of a misfire of said engine; and a controller operable to determine, on the basis of said misfire-frequency data, whether said misfiring state of said engine has occurred, said controller:

initiating a misfire detecting operation to detect an occurrence of a misfire of said engine when a predetermined first condition is satisfied, and resetting said misfire-frequency data stored in said memory, while an ignition switch remains in an ON position, when a predetermined second condition is satisfied, said predetermined first condition indicating that said engine has entered into a firing state by cranking of said engine for starting thereof, and said predetermined second condition indicating that said engine has failed to enter into the firing state by said cranking after said first condition has been satisfied.

2. A misfire detecting device according to claim 1, wherein said controller resets said misfire-frequency date each time said predetermined second condition is satisfied.

3. A misfire detecting device according to claim 1, wherein said predetermined first condition includes a condition that an operating speed of said engine has reached or exceeded a predetermined threshold value.

4. A misfire detecting device according to claim 1, wherein said predetermined second condition includes a condition that an operating speed of said engine has dropped to or below a threshold value corresponding to an operating speed of a starter provided to crank said engine.

5. A misfire detecting advice according to claim 1, wherein said memory includes a memory area assigned to store said misfire-frequency data, and said controller selectively clears only said memory area of said memory to reset said misfire-frequency data.

6. A misfire detecting device according to claim 1, wherein:
said engine is installed on a vehicle; and
said memory consists of a volatile memory assigned to store control data that controls said engine, said control data including said misfire-frequency data.

7. A misfire detecting device according to claim 1, wherein said misfire-frequency data stored in said memory includes data indicative of a number of misfire detecting cycles implemented in respective combustion cycles of said engine, and data indicative of the number of occurrences of said misfire of said engine, each of which has been detected upon determination that an amount of variation in an operating angle of an output shaft of said engine in a corresponding one of said combustion cycles is larger than a predetermined threshold value.

8. A misfire detecting device according to claim 7, wherein said controller counts the number of occurrences of said misfire, so as to exclude an amount of variation in said operating angle of said output shalt, wherein said amount is considered to have exceeded said predetermined threshold value for a reason other than an actual misfire of said engine.

9. A misfire detecting device that detects a misfiring state of an engine, comprising:
a memory that stores misfire-frequency data relating to a frequency of occurrence of a misfire of said engine; and
a controller operable to determine, on the basis of said misfire-frequency data, whether said misfiring state of said engine has occurred, said controller:
initiating a misfire detecting operation to detect an occurrence of a misfire of said engine when a predetermined condition is satisfied, said predetermined condition indicating that said engine has entered into a firing state by cranking of said engine for starting thereof, and
resetting said misfire-frequency data stored in said memory each time said engine is cranked for starting of the engine without resetting an ignition switch.

10. A misfire detecting device according to claim 9, wherein:

said memory includes a memory area assigned to store said misfire-frequency data; and
said controller selectively clears only said memory area of said memory to reset said misfire-frequency data.

11. A misfire detecting device according to claim 9, wherein:
said engine is installed on a vehicle; and
said memory consists of a volatile memory assigned to store control data that controls said engine, said control data including said misfire-frequency data.

12. A misfire detecting device according to claim 9, wherein said misfire-frequency data stored in said memory includes data indicative of a number of misfire detecting cycles implemented in respective combustion cycles of said engine, and data indicative of the number of occurrences of said misfire of said engine, each of which has been detected upon determination that an amount of variation in an operating angle of an output shaft of said engine in a corresponding one of said combustion cycles is larger than a predetermined threshold value.

13. A misfire detecting device according to claim 11, wherein said controller counts the number of occurrences of said misfire, so as to exclude an amount of variation in said operating angle of said output shaft, wherein said amount is considered to have exceeded said predetermined threshold value for a reason other than an actual misfire of said engine.

14. A method of detecting a misfiring state of an engine, comprising the steps of:
initiating a misfire detecting operation to detect an occurrence of a misfire of said engine when a predetermined first condition is satisfied, said predetermined first condition indicating that said engine has entered into its fixing state by cranking of said engine for starting thereof;
storing in a memory misfire-frequency data relating to a frequency of occurrence of said misfire of said engine, and determining on the basis of said misfire-frequency data, whether said misfiring state of said engine has occurred; and
resetting said misfire-frequency data stored in said memory, while an ignition switch remains in an ON position, when a predetermined second condition is satisfied, said predetermined second condition indicating that said engine has failed to enter into its firing state by said cranking after said first condition has been satisfied.

15. A method according to claim 14, wherein said misfire-frequency data is reset each time said predetermined second condition is satisfied.

16. A method according to claim 14, wherein said predetermined first condition includes a condition that an operating speed of said engine has reached or exceeded predetermined threshold value.

17. A method according to claim 14, wherein said second predetermined condition includes a condition that an operating speed of said engine has dropped to or below a threshold value corresponding to an operating speed of a starter provided to crank said engine.

18. A method of detecting a misfiring state of an engine, comprising the steps of:
initiating a misfire detecting operation of detecting an occurrence of a misfire of said engine when a predetermined condition is satisfied, said predetermined condition indicating that said engine has entered into its firing state by cranking of said engine for starting thereof;

storing in a memory misfire-frequency data relating to a frequency of occurrence of said misfire of said engine, and determining, on the basis of said misfire-frequency data, whether said misfiring state of said engine has occurred; and resetting said misfire-frequency data stored in said memory each time said engine is cranked for starting of the engine without resetting an ignition switch.

19. A method according to claim 18, wherein said memory includes a memory area assigned to store said misfire-frequency data, and only said memory area of said memory is selectively cleared to reset said misfire-frequency data.

* * * * *